United States Patent
Mayer

(10) Patent No.: US 11,624,415 B2
(45) Date of Patent: Apr. 11, 2023

(54) CALIPER BRAKE

(71) Applicant: RINGSPANN GmbH, Bad Homburg (DE)

(72) Inventor: Achim Mayer, Bad Homburg (DE)

(73) Assignee: Ringspann GmbH, Bad Homburg (DE)

( * ) Notice: Subject to any disclaimer, the term of this patent is extended or adjusted under 35 U.S.C. 154(b) by 77 days.

(21) Appl. No.: 17/361,901

(22) Filed: Jun. 29, 2021

(65) Prior Publication Data

US 2022/0034374 A1 Feb. 3, 2022

(30) Foreign Application Priority Data

Jul. 31, 2020 (DE) .......................... 102020120313.6

(51) Int. Cl.

| | |
|---|---|
| *B60T 13/04* | (2006.01) |
| *F16D 55/226* | (2006.01) |
| *F16D 65/16* | (2006.01) |
| *F16D 121/20* | (2012.01) |
| *F16D 125/66* | (2012.01) |
| *F16D 55/00* | (2006.01) |

(52) U.S. Cl.
CPC .......... *F16D 55/226* (2013.01); *F16D 65/16* (2013.01); *F16D 2055/0016* (2013.01); *F16D 2121/20* (2013.01); *F16D 2125/66* (2013.01)

(58) Field of Classification Search
CPC .. F16D 55/228; F16D 65/567; F16D 65/0068; F16D 55/226; F16D 59/02; F16D 65/16; F16D 65/092; F16D 2121/22; F16D 2125/66; F16D 2055/0016; F16D 2121/20

USPC ..... 188/72.2, 72.3, 72.7, 158–161, 170, 171
See application file for complete search history.

(56) References Cited

U.S. PATENT DOCUMENTS 6,802,402 B2 * 10/2004 Bausch .................... H02P 3/04
                                                           188/161
9,316,262 B2 *  4/2016 Müller .................. F16C 29/126

FOREIGN PATENT DOCUMENTS

| DE | 2653320 | 6/1978 |
|---|---|---|
| DE | 10239793 | 3/2003 |
| DE | 10127664 | 4/2003 |
| DE | 102005045114 | 4/2007 |
| KR | 1020080111275 | 12/2008 |

* cited by examiner

*Primary Examiner* — Christopher P Schwartz
(74) *Attorney, Agent, or Firm* — Volpe Koenig

(57) ABSTRACT

A caliper brake for braking a moving component, including a housing and two brake shoes, which are movable within the housing toward the component to be braked, and a bearing part, which is movable within the housing by an actuator. The brake shoes each have a wedge surface on a side facing away from the component to be braked, by which a braking force acting on the bearing part is transmitted to the brake shoes with deflection and force multiplication. For higher braking forces using a spring-actuated brake, and to reduce the effects of spring travel on the braking force, the bearing part has offset bearing locations against which the wedge surfaces of each brake shoe bear. The wedge surfaces each have, in the region of the bearing locations, a step which is overcome during a closing movement of the brake shoes before they engage the component to be braked.

15 Claims, 4 Drawing Sheets

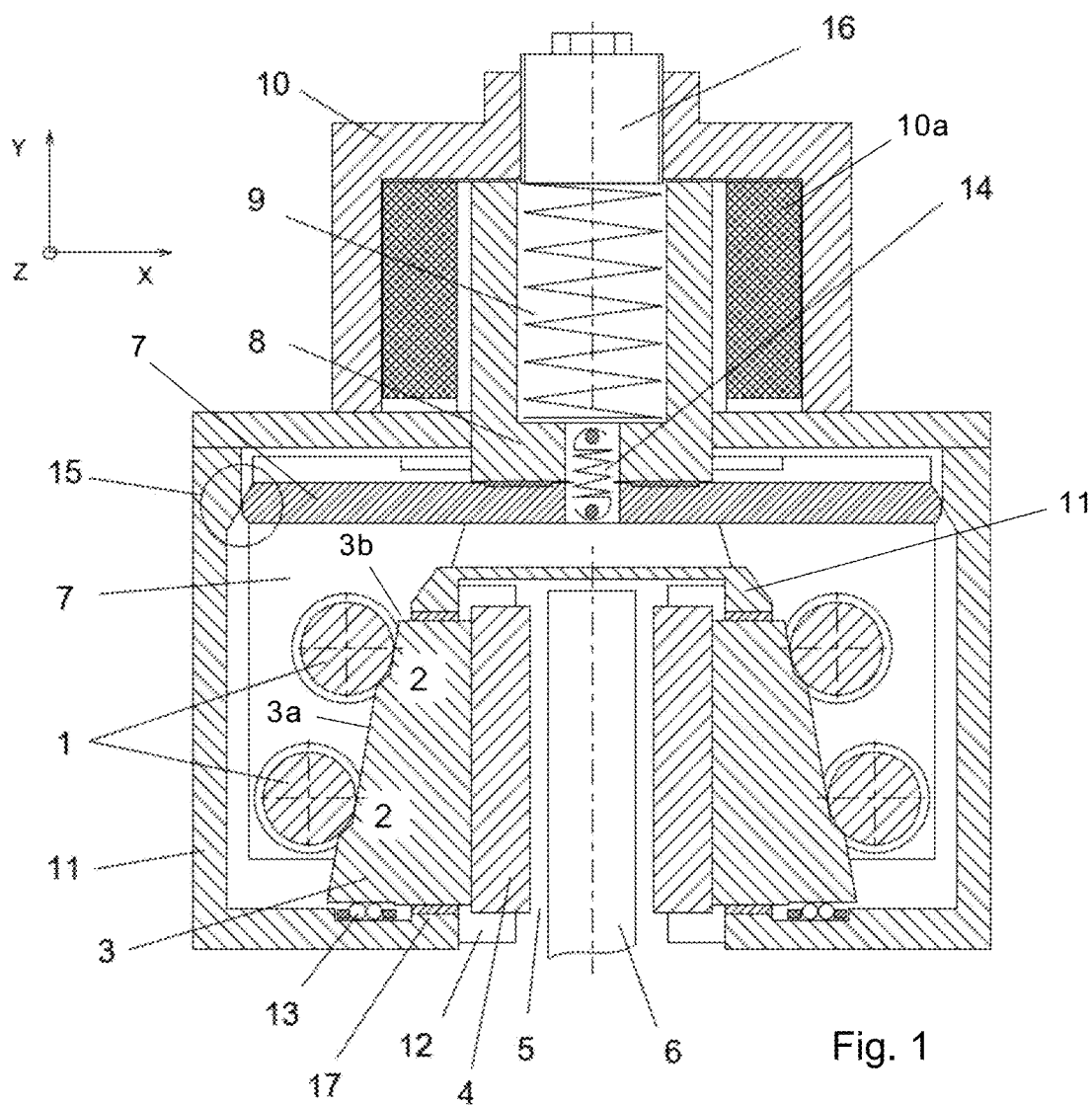
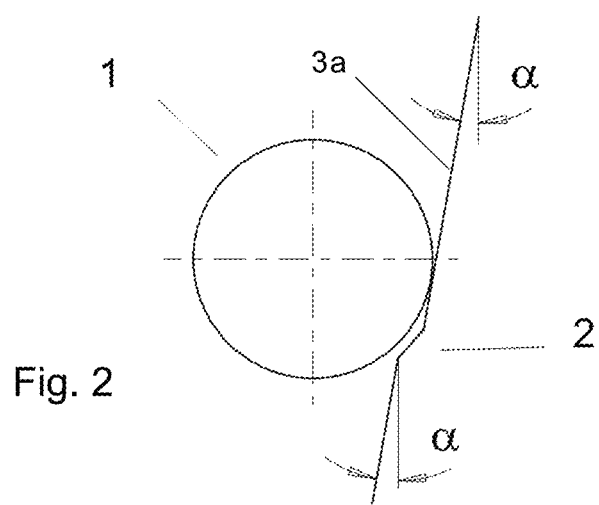
Fig. 1
Fig. 2

CALIPER BRAKE

INCORPORATION BY REFERENCE

The following documents are incorporated herein by reference as if fully set forth: German Patent Application no. 10 2020 120 313.6, filed Jul. 31, 2020.

TECHNICAL FIELD

The present invention relates to a caliper brake for braking and/or fixing a component which performs a relative movement with respect thereto, the caliper brake having a housing which fits in a U shape around the component to be braked, two brake shoes, which can be moved in the manner of pincers within the housing in the direction of the component to be braked, and a bearing part, which can be moved within the housing via an actuator, wherein the brake shoes each have on their side facing away from the component to be braked a wedge surface, by which they are supported on the bearing part on both sides of the component to be braked and by which a braking force acting on the bearing part is transmitted to the brake shoes with deflection and force multiplication.

BACKGROUND

An electromagnetically actuable braking device in which the spring force of a brake spring is transmitted with deflection and force multiplication to the brake shoes and to a bearing part via wedge bevels is known from DE 101 27 664 C1. In this case, a flat cage with balls or rollers is arranged between the wedge surfaces. In the case of a spring-actuated brake, it is disadvantageous here that the spring relaxes when the brake is closed until the brake shoes bear against the brake disk and the air gap between the brake shoes and the brake disk has been overcome. Thus, the spring force is greater in the open state than in the closed state. The electromagnet with which the brake is opened must therefore be designed for the greatest spring force in the open state.

SUMMARY

It is therefore an object of the invention to provide a caliper brake with which higher braking forces can be achieved, and in which, in the case of a spring-actuated brake, the reduction of the braking force caused by the spring travel in the closed state is at least less.

The object is achieved by a caliper brake having one or more of the features disclosed herein. Advantageous embodiments can be found below and in the claims.

In the case of a caliper brake of the type stated at the outset, the invention envisages that the bearing part for each of the brake shoes has two bearing locations, which are arranged offset by an amount corresponding to the wedge angle of the wedge surfaces and against which the wedge surfaces bear, and the wedge surfaces each have, in the region of the bearing locations, a step which is overcome during a closing movement of the brake shoes before the brake shoes come to bear against the component to be braked.

Instead of two corresponding wedge surfaces, the invention thus uses two offset bearing locations as abutments. These can preferably be formed by rolling elements, in particular rollers or balls, mounted in the bearing part. This considerably reduces the frictional force acting between the bearing part and the wedge surfaces of the brake shoes. Thus, the wedge surfaces can be made steeper without self-locking occurring in the braked state. With the aid of the steps formed in the wedge surfaces, the air gap between the brake shoes and the component to be braked is, so to speak, overcome abruptly, thus ensuring that, in the case of a spring-actuated brake, the brake spring relaxes less, which leads to a higher clamping force with the same spring. Since, with the same clamping force, the maximum spring force is smaller than in the prior art, the actuator required for opening the brake, for example an electromagnet, can be made smaller and more economical in terms of resources. The caliper brake according to the invention can furthermore be constructed in a very compact and lightweight manner and, because of its construction, can be protected simply and reliably from external influences.

In a preferred embodiment, the caliper brake is designed as a self-closing brake with a brake spring. In this case, the bearing part is driven by the brake spring applying the braking force into a closed position, in which the brake shoes bear against the component to be braked, and, to open the brake shoes, the actuator moves the bearing part, overcoming the spring force of the brake spring, into an open position, in which the brake shoes are released from the component to be braked. When a brake spring is used, an adjusting device or adjuster, in particular an adjusting screw, can furthermore expediently be provided, by which the prestress of the brake spring can be adjusted. The braking force can thereby be adapted to the respective application.

However, it is likewise possible within the scope of the present invention to embody the caliper brake as an actuator-actuated brake. In this case, the bearing part is moved by the actuator, thereby applying the braking force, into a closed position, in which the brake shoes bear against the component to be braked. In addition, a return spring can be provided by which the brake shoes are released from the component to be braked when the brake is opened. Alternatively, the brake shoes can also be released by the actuator itself, insofar as this is double-acting.

In a preferred embodiment of the invention, an electromagnet having a magnet coil and an armature connected to the bearing part can be designed as an actuator. Alternatively, however, the actuator can also be designed as a hydraulically or pneumatically actuated cylinder-piston unit.

In a development of the invention, the actuator is connected to the bearing part by a linear guide extending in the direction of movement of the brake shoes. The bearing part thus remains movable in the direction of movement of the brake shoes, thus ensuring that a compensating movement can take place in the event of different air gaps between the two brake shoes and the component to be braked, so that the same force acts on both sides of the component to be braked. An unequal air gap can occur as a result of assembly deviations and particularly when using a brake disk as the component to be braked, due to shaft misalignment. Bending forces on the brake shaft of the brake disk or uneven wear of the brake linings are thus avoided.

In a preferred development, it is additionally possible to provide a centering device on the housing, in particular oblique surfaces arranged on the inside in the region of an open position, said centering device centering the bearing part within the housing during a movement from a closed position into the open position. This prevents the dead weight of the bearing part from pressing the brake shoes against one side of the component to be braked in the open state. The brake linings assume a defined position in the open state. Centering is preferably carried out in such a way that, after a small actuating stroke of the actuator when closing, e.g. a few millimeters, the bearing part once more has sufficient play with respect to the brake housing.

When using a linear guide between the actuator and the bearing part, it is furthermore advantageous to provide a preloading spring, by which the linear guide is preloaded in the direction of movement of the actuator, canceling its bearing play.

By virtue of the low friction between the bearing part and the brake shoes, the wedge surfaces can be designed for high force multiplication. The force multiplication within the scope of the invention is preferably in the range of 2 to 10 times, in particular 5 to 6 times, force multiplication.

In one embodiment, the brake shoes each have a brake lining and a wedge segment. It is particularly advantageous here for the wedge segment to be equipped with a readjusting device for wear compensation. When the travel of the brake shoes increases as a result of wear of the brake linings, the readjusting device, by using an opening movement, increases the distance between the wedge surface and the brake lining, so that the wear of the lining is compensated. For this purpose, the wedge segment is of two-part design, for example, the two parts being connected by a thread. By rotating the two parts relative to one another, the total length of the two parts can be increased. For automatic readjustment, the stroke movement of the actuator is used to bring about the rotational movement. The greater the lining wear, the longer the stroke movement and the greater the twist in the thread, which then leads in turn to wear compensation.

In one development of the invention, provision can furthermore be made for the brake shoes each to be mounted so as to be linearly movable on an underside of the housing by an axial rolling bearing and/or a slide bush. Guidance by axial bearings and bushes ensures a constant wedge angle and thus constant force multiplication, even if the brake linings are worn obliquely owing to external circumstances and, in this case, forces which tend to change the position of the brake shoes are produced. In addition, a slide bush can protect against the penetration of dirt and moisture.

In another advantageous development, side plates are attached to the housing and form an end-face stop for the brake shoes, thus allowing braking forces acting on the brake shoes to be transmitted to the brake housing during braking.

Furthermore, it is preferably provided within the scope of the present invention that the bearing locations are formed by rollers, wherein the rollers are mounted in the bearing part by rolling bearings. This results in particularly low frictional losses. As an alternative to the rolling bearings mentioned, the rollers can also be mounted in the bearing part using plain bearings in order to save costs.

BRIEF DESCRIPTION OF THE DRAWINGS

Further refinements and advantages of the invention will be found in the following description of an exemplary embodiment with reference to the figures, in which:

FIG. 1 shows a cross section through a caliper brake according to the invention in one exemplary embodiment, FIG. 2 shows a detail view of the stepped wedge surface of a brake shoe with a roller of the bearing part bearing against the wedge surface.

DETAILED DESCRIPTION

Figure 3:
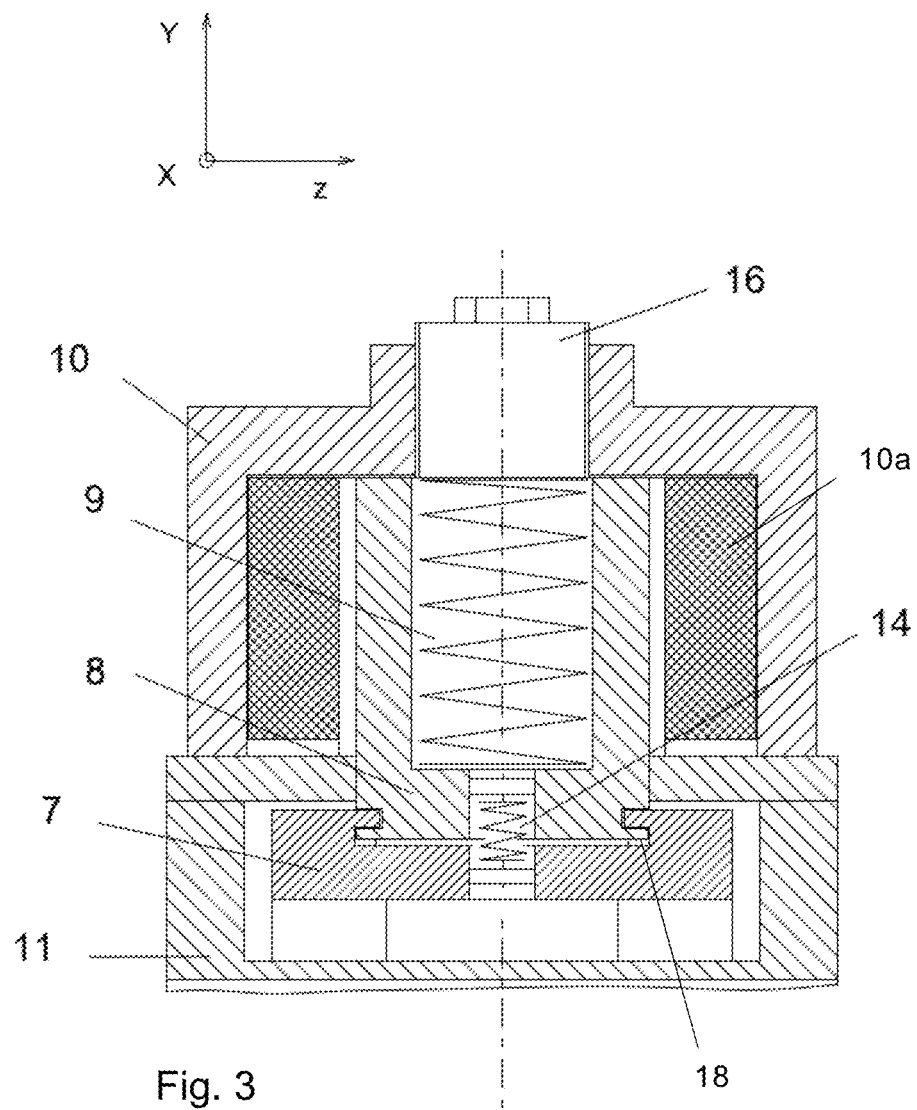
FIG. 3 is a detail of a cross section perpendicular to the drawing plane in FIG. 1, with a linear guide between the actuator and the bearing part, FIG. 4, based on FIG. 1, shows an exemplary embodiment with rolling bearings for supporting the rollers.

The braking device illustrated in FIG. 1 is a caliper brake for a brake disk 6. Here, the brake disk 6 rotates perpendicularly to the drawing plane. However, the brake can also be used as a linear brake in other device embodiments, a brake rail then being provided as the component to be braked instead of the brake disk 6.

The caliper brake has a housing 11, which is arranged in a U shape around the brake disk 6. Arranged within the housing 11, on both sides of the brake disk 6, there are two brake shoes 3, which are moved inward in the direction of the brake disk 6 in the manner of pincers to close the brake. For this purpose, the brake shoes 3 each have a wedge segment 3b which carries a brake lining 4 on its side facing the brake disk 6 and is designed as a wedge surface 3a on its side facing away from the brake disk 6. The wedge surfaces 3a each have two steps or shoulders 2, the function of which will be explained below.

The brake is actuated by a brake spring 9, the spring force of which is transmitted via a bearing part 7 to the wedge bevels 3a of the brake shoes 3. For this purpose, the bearing part 7 is designed as a roller bearing which, as abutments or bearing locations, has in each case two offset, rotatably mounted rollers 1 per brake shoe 3. The offset of the rollers in the X direction (cf. FIG. 1), i.e. in the direction of movement of the brake shoes, corresponds to the wedge angle α of the wedge surfaces 3a plus the height of a step 2.

FIG. 1 shows the brake in its open position, in which there is an air gap 5 between the brake disk 6 and the brake linings 4. This ensures that the brake linings 4 do not rub on the rotating brake disk 6. In the open position, the rollers 1 each rest against the wedge surfaces 3a in the region of the steps 2. If the roller bearing 7 is pressed downward against the lower region of the brake housing 11 by the force of the brake spring 9, the wedge surfaces 3a deflect the braking force onto the brake shoes 3, causing them to move inward against the brake disk 6. During this process, the step 2 is first overcome, as a result of which the brake shoes are moved abruptly inward. This initial abrupt movement due to the steps 2 corresponds approximately to the air gap 5, and therefore the brake linings 4 immediately come into contact with the brake disk 6. Thus, the onset of a braking effect is achieved even with just a small spring stroke of the brake spring 9.

FIG. 2 shows in more detail the contact of a roller 1 against the wedge surface 3a just before the step 2. This position corresponds to the open position of the brake. In front of and behind the step 2, the wedge surface 3a has an angle of inclination α, the wedge angle, which effects the force deflection and force multiplication. In the region of the step, this angle is made much flatter, to an actual 90° angle. The height of the step is selected to be somewhat smaller than the width of the air gap 5, and therefore, when the brake is closed, the rollers 1 only just roll over the steps 2 and come into contact with the wedge surface 3a in the region behind the step 2.

The brake in the exemplary embodiment is designed as an electromagnetically releasable brake. For this purpose, an actuator in the form of an electromagnet 10 is provided, having a magnet coil 10a and an armature 8 movable in the axial direction within the magnet coil 10a. The armature 8 is connected to the roller bearing 7. When the magnet 10 is attracted, the armature 8 is pulled upward in the direction of the magnet coil 10a, and the brake spring 9 is compressed. As a result, the roller bearing 7 is raised, with the result that the brake shoes 3 are released or retracted from the brake disk 6. The retraction or release of the brake shoes can be effected by a slight unbalance of the brake disk 6 or by return springs (not shown here).

In the same way, an electromagnetically actuated active brake could also be implemented. In this case, the electromagnet presses on the roller bearing 7 via a spring in the energized state. A further spring ensures that the brake is always open in the deenergized state. A pneumatic or hydraulic cylinder would also be conceivable as an alternative to the electromagnet.

FIG. 3 shows schematically the coupling between the roller bearing 7 and the armature 8 of the electromagnet 10. These are connected via a linear guide 18, as shown here via a T-slot. As a result, the roller bearing 7 can be moved in the direction of movement of the brake shoes 3 (x direction) when the brake is actuated. This ensures that a compensating movement takes place in the event of different air gaps 5 at the brake disk, and therefore the same force always acts on both sides of the brake disk 6 and thus bending on the brake shaft is prevented. Instead of a T-slot, any other linear guide, for example a dovetail guide, can be used. The linear guide 18 is preloaded by a tension spring 14, thus eliminating any bearing play. Here, the tension spring 14 can be guided through an aperture in the armature 8 and the upper part of the roller bearing 7.

The brake spring 9 is prestressed by an adjusting screw 16. The spring travel and thus the braking force can thereby be adjusted in accordance with the respective application.

When the brake is opened, the roller bearing 7 is retracted into the upper region of the housing 11. In this case, lateral bevels 15 act as a centering device and ensure that the roller bearing 7 assumes a defined, centered position within the housing 11 in the open state.

On the underside of the housing 11, the brake shoes 3 are supported so as to be movable in the linear direction by an axial bearing 13. A slide bush 17 provides for sealing of the brake housing and additional guidance for the brake shoes 3. Axial bearing 13 and slide bush 17 ensure that the brake shoes 3 cannot tilt during closing and the wedge angle α remains constant, ensuring that constant force multiplication is achieved over the wedge angle α.

Side plates 12 on the housing 11 bear against the end faces of the brake shoes 3 and transmit the braking forces acting from the brake disk 6 on the brake shoes 3 to the housing 11.

Figure 4:
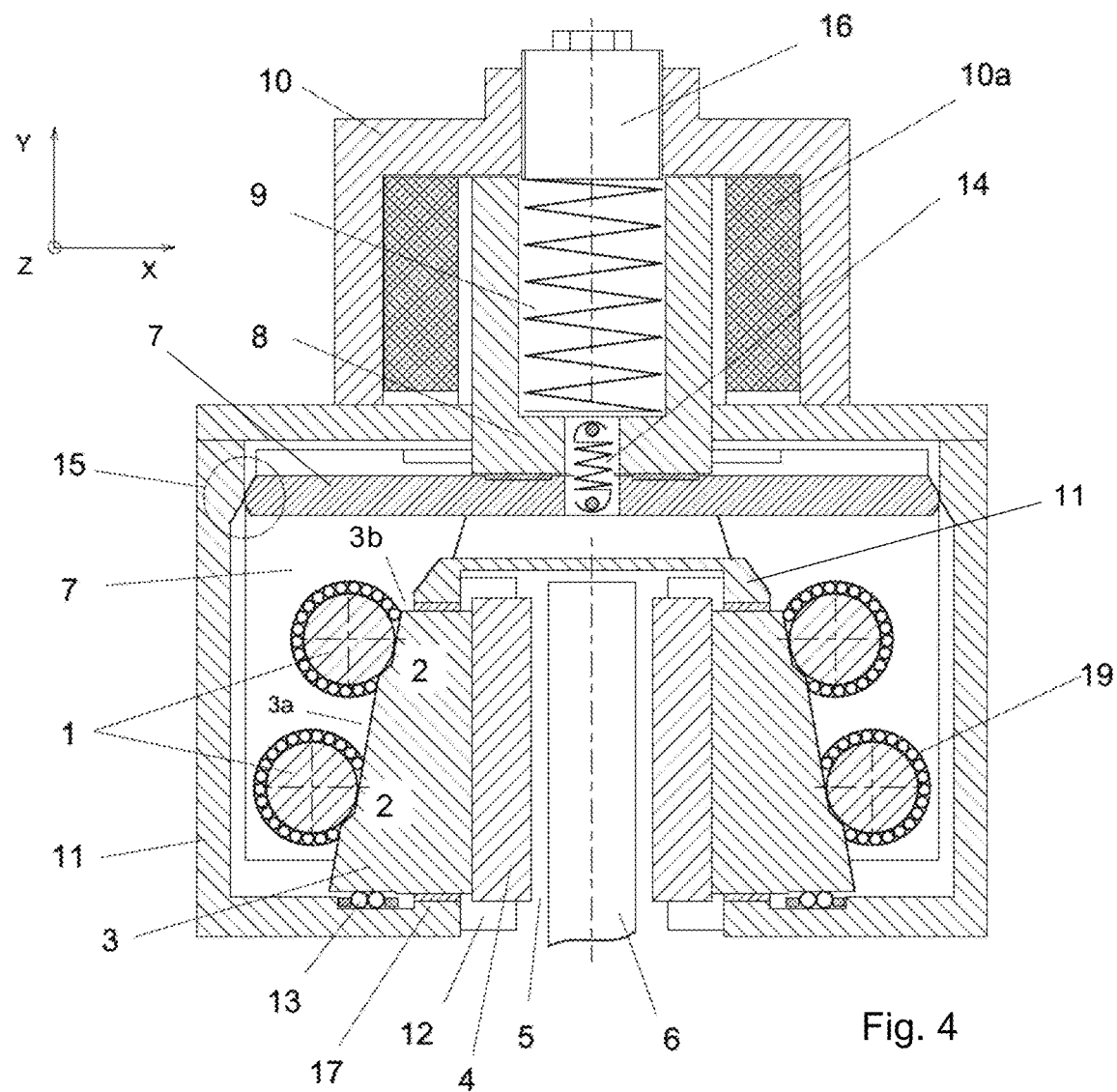

A further exemplary embodiment of a caliper brake is shown in FIG. 4. Here, starting from the exemplary embodiment shown in FIG. 1, the rollers 1 are each supported by a radial rolling bearing 19, in this case a needle bearing. This leads to reduced friction during rolling of the rollers 1 relative to the wedge surface 3a, thus enabling higher braking forces to be achieved.

Figure 5:
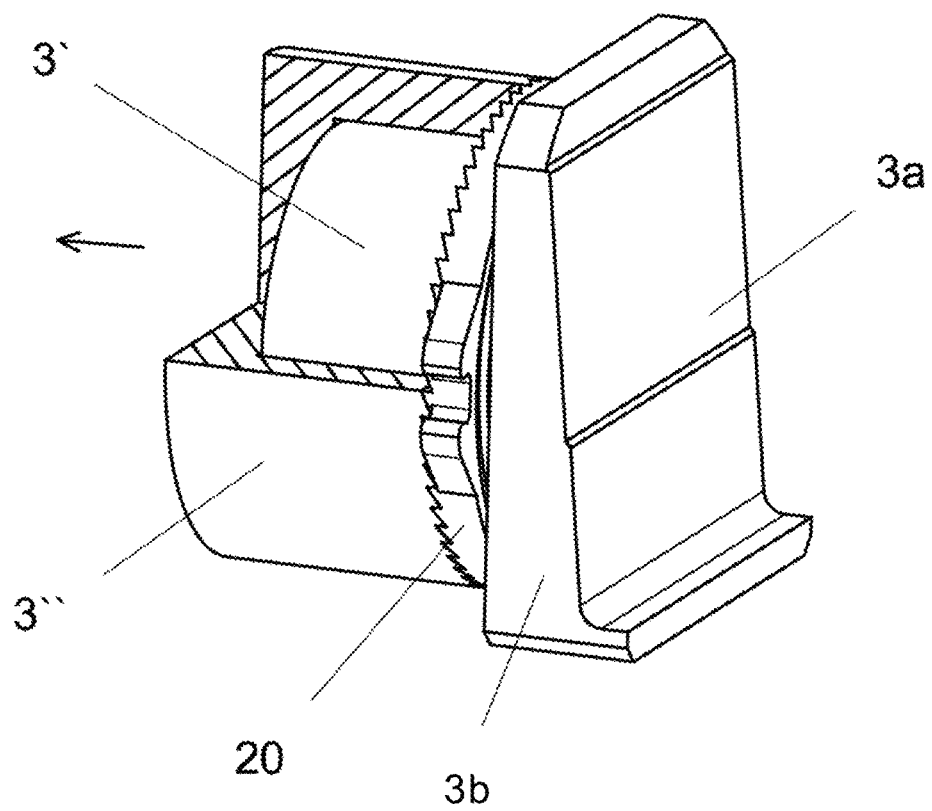
FIG. 5 shows an exemplary embodiment of a brake shoe with a readjusting device for wear compensation.

As already mentioned, an automatic lining wear compensator of a design known per se can be integrated into each of the brake shoes 3. A corresponding exemplary embodiment of such a brake shoe 3 is shown in FIG. 5. Here, the wedge segment is of two-part design, the two parts 3', 3" being connected by a thread. When the brake shoes 3 are moved back, the inner part 3' of the brake shoes 3 is in each case unscrewed by a small amount, and therefore, as the wear of the brake linings 4 increases, the total length of the parts 3', 3" forming the brake shoes 3 increases.

The rear part 3' of the brake shoe 3, which bears the wedge surface 3a on its rear side, is cylindrically shaped on the other side and provided with an external thread. The latter cooperates with a sleeve-shaped outer part 3" having an internal thread, on which the brake lining (not shown in FIG. 5) is arranged. A readjusting ring 20 is guided rotatably in one direction on the outer part 3" and has a recess in which the bearing part 7 engages. When the brake is opened, the outer part 3" is rotated by the readjusting ring, in the process being moved out by way of the thread, and thus counteracts lining wear.

The invention claimed is:

1. A caliper brake for at least one of braking or fixing a component (6) which performs a relative movement with respect to the caliper brake, the brake caliper comprising:
    a housing (11) that fits with a U shape around the component (6) to be braked,
    two brake shoes (3), which can be moved in a manner of pincers within the housing (11) in a direction of the component (6) to be braked,
    a bearing part (7) that is movable within the housing (11) by an actuator (8, 10),
    the brake shoes (3) each have a wedge surface (3a) on a side thereof facing away from the component (6) to be braked, by which the brake shoes are respectively supported on the bearing part (7) with one of the brake shoes on each side of the component (6) to be braked and by which a braking force acting on the bearing part (7) is transmitted to the brake shoes (3) with deflection and force multiplication,
    the bearing part (7) has two bearing locations (1) for each of the brake shoes (3) that are arranged offset by an amount corresponding to a wedge angle (a) of the wedge surfaces (3a) and against which the wedge surfaces (3a) bear, and
    the wedge surfaces (3a) each have, in a region of the bearing locations (1), a step (2) which is overcome during a closing movement of the brake shoes (3) before the brake shoes (3) come to bear against the component (6) to be braked.

2. The caliper brake as claimed in claim 1, wherein the bearing locations (1) are formed by rolling elements mounted in the bearing part (7).

3. The caliper brake as claimed in claim 1, further comprising a brake spring (9) that is arranged to drive the bearing part (7) to apply a braking force to move the bearing part (7) into a closed position, in which the brake shoes (3) bear against the component (6) to be braked, and, to open the brake shoes (3), the actuator (8, 10) moves the bearing part (7), overcoming the spring force of the brake spring (9), into an open position, in which the brake shoes (3) are released from the component (6) to be braked.

4. The caliper brake as claimed in claim 3, further comprising an adjuster for adjusting a prestress of the brake spring.

5. The caliper brake as claimed in claim 1, wherein the bearing part (7) is adapted to be moved by the actuator (8, 10), thereby applying the braking force, into a closed position, in which the brake shoes (3) bear against the component (6) to be braked.

6. The caliper brake as claimed in claim 1, wherein the actuator (8, 10) is an electromagnet including a magnet coil (10) and an armature (8) connected to the bearing part (7).

7. The caliper brake as claimed in claim 1, wherein the actuator is a hydraulically or pneumatically actuated cylinder-piston unit.

8. The caliper brake as claimed in claim 1, wherein the actuator (8, 10) and the bearing part (7) are connected to one another by a linear guide (18) extending in a direction of movement of the brake shoes.

9. The caliper brake as claimed in claim 8, further comprising a preloading spring (14) that loads the linear guide (18) in the direction of movement of the actuator (8, 10) in order to reduce bearing play.

10. The caliper brake as claimed in claim 8, wherein the housing includes a centering device having oblique surfaces (15) arranged on an inside of the housing in a region of an open position, which centers the bearing part (7) within the housing during a movement from a closed position into the open position.

11. The caliper brake as claimed in claim 1, wherein the force multiplication by the wedge surfaces (3*a*) is in the range of 2-10 times force multiplication.

12. The caliper brake as claimed in claim 1, wherein the brake shoes (3) each include a brake lining (4) and a wedge segment, the wedge segment comprises a readjuster (3", 20) for wear compensation, which, by using an opening movement, increases a distance between the wedge surface (3*a*) and the brake lining (4) when a travel of the brake shoes (3) increases as a result of wear of the brake lining (4).

13. The caliper brake as claimed in claim 1, wherein the brake shoes (3) are each mounted so as to be linearly movable on an underside of the housing (11) by at least one of an axial rolling bearing (13) or a slide bush (17).

14. The caliper brake as claimed in claim 1, further comprising side plates (12) fixed to the housing that form a stop for the brake shoes (3) in order to absorb braking forces acting on the brake shoes (3).

15. The caliper brake as claimed in claim 1, wherein the bearing locations (1) are formed by rollers, and the rollers are mounted with rolling bearings (19) in the bearing part (7).

* * * * *